US012759058B2

(12) United States Patent
Kobayashi et al.

(10) Patent No.: US 12,759,058 B2
(45) Date of Patent: Oct. 13, 2026

(54) HOLDER, CUTTING TOOL, AND METHOD FOR MANUFACTURING MACHINED PRODUCT

(71) Applicant: KYOCERA CORPORATION, Kyoto (JP)

(72) Inventors: Youji Kobayashi, Kyoto (JP); Naoki Yukimoto, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 296 days.

(21) Appl. No.: 18/695,859

(22) PCT Filed: Oct. 3, 2022

(86) PCT No.: PCT/JP2022/036897
§ 371 (c)(1),
(2) Date: Mar. 27, 2024

(87) PCT Pub. No.: WO2023/058588
PCT Pub. Date: Apr. 13, 2023

(65) Prior Publication Data

US 2024/0383047 A1 Nov. 21, 2024

(30) Foreign Application Priority Data

Oct. 6, 2021 (JP) ................................. 2021-164670

(51) Int. Cl.
*B23B 29/12* (2006.01)

(52) U.S. Cl.
CPC .................................... *B23B 29/12* (2013.01)

(58) Field of Classification Search
CPC ......... B23B 29/12; B23B 29/24; B23B 29/04; B23B 27/14; B23B 2260/072
See application file for complete search history.

(56) References Cited

U.S. PATENT DOCUMENTS

| | | | | |
|---|---|---|---|---|
| 9,517,509 | B2 * | 12/2016 | Inoue | B23B 29/043 |
| 11,154,936 | B2 * | 10/2021 | Kobayashi | B23B 29/12 |
| 11,806,792 | B2 * | 11/2023 | Kobayashi | B23B 1/00 |
| 12,179,274 | B2 * | 12/2024 | Luik | B23B 29/043 |
| 2019/0015904 | A1 * | 1/2019 | Kobayashi | B23B 27/10 |
| 2020/0361004 | A1 * | 11/2020 | Kobayashi | B23B 1/00 |

(Continued)

FOREIGN PATENT DOCUMENTS

| | | |
|---|---|---|
| JP | 2002346808 A | * 12/2002 |
| JP | 2011245594 A | * 12/2011 |

(Continued)

*Primary Examiner* — Bayan Salone
(74) *Attorney, Agent, or Firm* — HAUPTMAN HAM, LLP

(57) ABSTRACT

A holder has a square column shape extending from a first end toward a second end. The holder includes a pocket located on a side of the first end, and a first side surface and a second side surface each extending from the first end toward the second end. The second side surface includes a first region that is flat and that is located on the side of the first end, a second region that is flat and that is located closer to the second end than the first region and closer to the first side surface than the first region, and a step connecting the first region and the second region. The step has a convex curve shape toward the second end in a cross section parallel to the first region.

10 Claims, 9 Drawing Sheets

(56) References Cited

U.S. PATENT DOCUMENTS

| | | | | |
|---|---|---|---|---|
| 2022/0055119 | A1* | 2/2022 | Suzuki | B23B 27/1662 |
| 2023/0381869 | A1* | 11/2023 | Yamamoto | B23B 27/10 |

FOREIGN PATENT DOCUMENTS

| | | | | |
|---|---|---|---|---|
| JP | 6361805 | B1 * | 7/2018 | |
| JP | 2020028943 | A * | 2/2020 | |
| JP | 2020104219 | A * | 7/2020 | |
| JP | 6803014 | B1 * | 12/2020 | B23B 27/1659 |
| JP | 2022035577 | A * | 3/2022 | B23B 27/1659 |
| WO | WO-2022085760 | A1 * | 4/2022 | B23B 27/141 |

* cited by examiner

HOLDER, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2022/036897 filed on Oct. 3, 2022, which claims priority to Japanese Patent Application No. 2021-164670, filed on Oct. 6, 2021.

TECHNICAL FIELD

The present disclosure relates to a holder for a cutting tool used when performing cutting machining for workpieces such as those made of metal, a cutting tool, and a method for manufacturing a machined product.

BACKGROUND OF INVENTION

For example, cutting tools described in Patent Documents 1 and 2 are each known as a cutting tool used when performing cutting machining for workpieces such as those made of metal. The cutting tools described in Patent Documents 1 and 2 are used in a state of being attached to a tool post. In the cutting tool described in Patent Document 1, a plate-like positioning member is attached to a tool body and a rear end portion of the positioning member is brought into contact with the tool post in order to improve attachment accuracy to the tool post. In the cutting tool described in Patent Document 2, a positioning pin is attached to a body portion, and the positioning pin is abutted against an abutment surface of the tool post.

CITATION LIST

Patent Literature

Patent Document 1: JP 2011-245594 A
Patent Document 2: Japanese Patent No. 6803014

SUMMARY

A holder of a non-limiting example of the present disclosure has a square column shape extending from a first end toward a second end. The holder includes a pocket located on a side of the first end and to which a cutting insert is configured to be attached, a first side surface extending from the first end toward the second end, and a second side surface located opposite the first side surface. The second side surface includes a first region that is flat and that is located on the side of the first end, a second region that is flat and that is located closer to the second end than the first region and closer to the first side surface than the first region, and a step connecting the first region and the second region. The step has a convex curve shape toward the second end in a cross section parallel to the first region.

DESCRIPTION OF EMBODIMENTS

Figure 1:
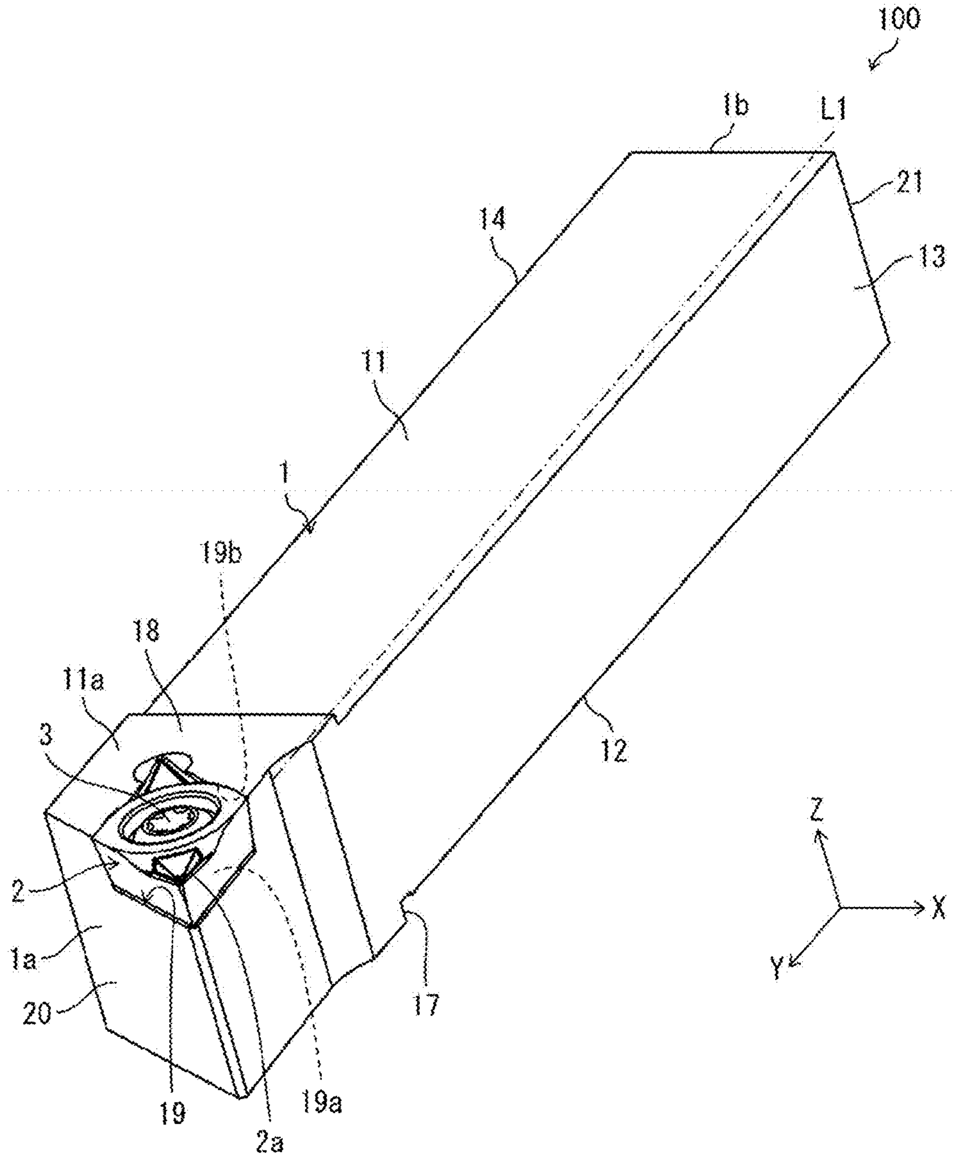
FIG. 1 is a perspective view illustrating a cutting tool of a non-limiting embodiment of the present disclosure.

A holder, a cutting tool, and a method for manufacturing a machined product according to one non-limiting example of the present disclosure will be described in detail with reference to the drawings. An example of the cutting tool is a turning tool. Examples of the turning tool include a groove-forming tool and a cutting-off tool. The groove-forming tool can be used in groove-forming, for example. A cutting tool 100 in one non-limiting example illustrated in FIG. 1 is a turning tool, and more specifically, a groove-forming or step-forming tool. In each of the drawings referred to below, for convenience of description, only main members among members constituting the non-limiting embodiment are illustrated in a simplified manner. Accordingly, the cutting tool 100 may include any constituent member that is not illustrated in each of the drawings referred to. The dimensions of members in the respective drawings do not accurately represent the actual dimensions of constituent members, the dimensional ratio of respective members, and the like.

In each of the drawings, the X-axis direction is defined as a left-right direction, the Z-axis direction is defined as an up-down direction, and the Y-axis direction is defined as a front-rear direction. In FIG. 1, a side on which a cutting insert 2 is located is defined as a right side in the X-axis direction, a front side in the Y-axis direction, and an upper side in the Z-axis direction. Below, the cutting insert 2 is simply referred to as “insert 2”.

The cutting tool 100 of one non-limiting example illustrated in FIG. 1 to FIG. 6 includes a holder 1, the insert 2, and a screw 3.

Holder

The holder 1 may have a square column shape extending from a first end 1*a* as a front end to a second end 1*b* as a rear end along a first central axis L1. In FIG. 1, the front side of the holder 1 in the Y-axis direction is the first end 1*a*, and the rear side is the second end 1*b*.

The size of the holder 1 is not particularly limited. For example, the length in a direction along the first central axis L1 may be set to be approximately from 10 mm to 250 mm. The height from an upper end to a lower end, in other words, the width in the up-down direction of the Z-axis may be set to be approximately from 5 mm to 50 mm.

Steel, cast iron, or the like may be used as a material of the holder 1. In particular, if steel is used among these materials, the toughness of the holder 1 is high.

As illustrated in FIG. 1, the holder 1 has a first side surface 11 extending upward in the Z-axis direction from the first end 1*a* toward the second end 1*b*, and a second side surface 12 located opposite the first side surface 11. The holder 1 has a third side surface 13 located between the first side surface 11 and the second side surface 12, and a fourth side surface 14 located between the first side surface 11 and the second side surface 12 and located opposite the third side surface 13. The third side surface 13 is a right front surface in FIG. 1, and the fourth side surface 14 is a left back surface in FIG. 1. The holder 1 has a front end surface 20 located on a side of the first end 1*a* and a rear end surface 21 located opposite the front end surface 20.

The first side surface 11 may have a protruding step 18 at a place closer to the first end 1*a* than the second end 1*b* so that a front end portion 11*a* protrudes upward. In this case, the thickness of the front end portion 11*a* can be ensured and a cutting load can be received during cutting machining. The front end portion 11*a* has a pocket 19 and is a portion for gripping the insert 2.

The front end surface 20 is not limited to the case of being orthogonal to the first central axis L1, and may be inclined from a direction orthogonal to the first central axis L1. The front end surface 20 does not need to be formed of one flat surface. For example, the front end surface 20 may be formed of a plurality of flat surfaces, or may be formed of a curved surface. In the example illustrated in FIG. 1, the front end surface 20 is inclined so that a side of the third side surface 13 is located on the front side in the Y-axis direction and a side of the fourth side surface 14 is located on the rear side in the Y-axis direction in conformity to the shape of the insert 2 having a rhombic plate shape.

A portion of the holder 1 on a side of the second end 1*b* may be supported by a tool post 4 (refer to FIG. 7) described below when attaching the cutting tool 100 to the tool post 4.

Pocket

A pocket 19 to which the insert 2 can be attached may be provided on the side of the first end 1*a* of the front end portion 11*a*. The pocket 19 may be a dent to which the insert 2 is attached. In the example illustrated in FIG. 1, the pocket 19 is open to the front end surface 20 and the third side surface 13. The pocket 19 has a bottom surface 19*a* with which an installation surface, which is one surface of the insert 2 in the thickness direction, comes into contact, and two restraint side surfaces 19*b* which are perpendicular to the bottom surface 19*a* and with which side surfaces of the insert 2 come into contact and are restrained. The bottom surface 19*a* may be parallel to the second side surface 12.

Insert

The shape of the insert 2 is not limited to a specific configuration. For example, the insert 2 may have a rod shape, a polygonal plate shape, or a polygonal column shape. In the present embodiment, the insert 2 has a rhombic plate shape as illustrated in FIG. 1. In case that the insert 2 has a rhombic plate shape, the shape of the bottom surface 19*a* of the pocket 19 may be a rhombus in conformity to the shape of the installation surface of the insert 2.

One corner on the side of the first end 1*a* of an upper surface of the insert 2 may be a cutting edge 2*a*. Specifically, the cutting edge 2*a* is located at an intersection of the upper surface of the insert 2, which is generally parallel to the first side surface 11, and a side surface of the insert 2, which intersects the upper surface. The cutting edge 2*a* includes an end portion on the side of the first end 1*a* of the upper surface of the insert 2. A through hole is provided in a central portion of the insert 2, and the insert 2 may be fixed to the pocket 19 by placing the rhombic installation surface on the bottom surface 19*a*, inserting the screw 3 into the through hole, and screwing the screw to the bottom surface 19*a*.

Examples of a material of the insert 2 include cemented carbide alloy and cermet. The composition of the cemented carbide alloy may include WC—Co, WC—TiC—Co, or WC—TiC—TaC—Co, for example. Here, WC, TiC and TaC may be hard particles, and Co may be a binder phase.

The cermet may be a sintered composite material in which metal is combined with a ceramic component. Examples of the cermet may include titanium compounds in which one of titanium carbide (TiC) and titanium nitride (TiN) is a main component. The material of the insert 2 is not limited to the composition described above.

A surface of the insert 2 may be coated with a coating film formed using a chemical vapor deposition (CVD) method or a physical vapor deposition (PVD) method. The composition of the coating film may include titanium carbide (TiC), titanium nitride (TiN), titanium carbonitride (TiCN), or alumina ($Al_2O_3$).

Second Side Surface and Step

Figure 2:
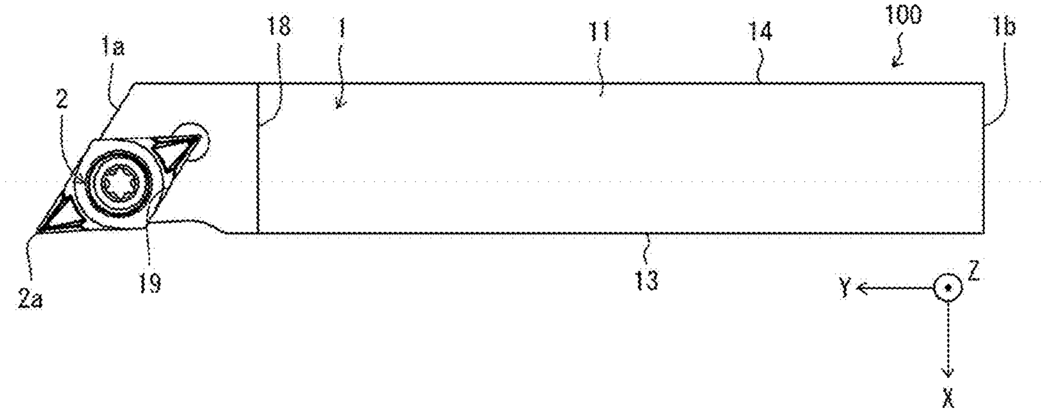
FIG. 2 is a plan view of the cutting tool illustrated in FIG. 1.
Figure 3:
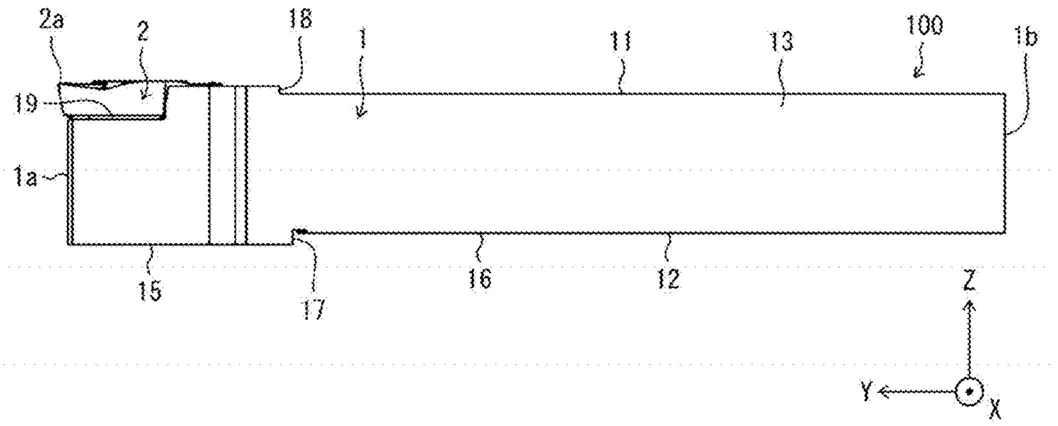
FIG. 3 is a side view of the cutting tool illustrated in FIG. 1.
Figure 4:
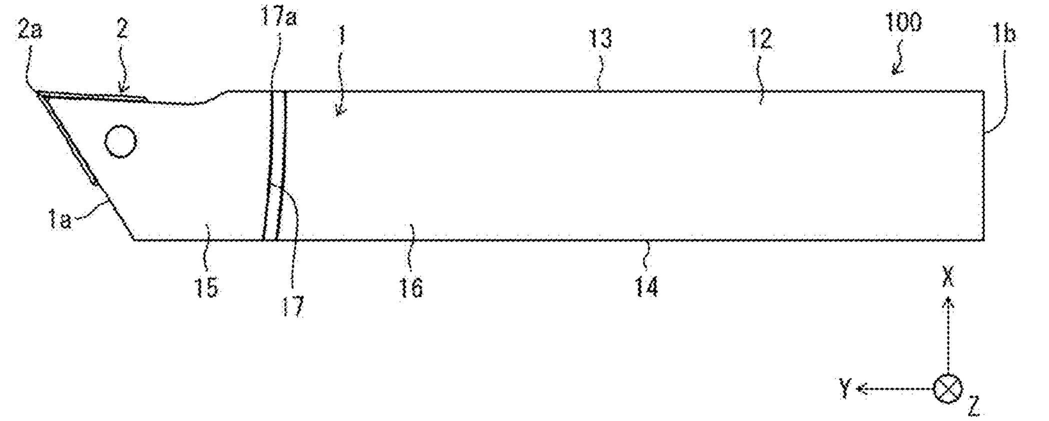
FIG. 4 is a rear view of the cutting tool illustrated in FIG. 1.

As illustrated in FIGS. 2 to 4, the second side surface 12 may include a first region 15, a second region 16, and a step 17. The first region 15 is, for example, a flat region located on the side of the first end 1*a*. The second region 16 is, for example, a flat region located closer to the second end 1*b* than the first region 15 and located closer to the first side surface 11 than the first region 15. The step 17 connects, for example, the first region 15 and the second region 16. As illustrated in FIG. 3, in the present embodiment, the step 17 is located closer to the side of the second end 1*b* than the protruding step 18.

The step 17 is a portion for positioning the cutting tool 100 on the tool post 4 and is locked to the tool post 4. In the cutting tool 100 of the present disclosure, unlike the cutting tool positioning structures of Patent Documents 1 and 2, the positioning member is not a member separate from the holder of the cutting tool but a part of the holder 1. Therefore, it is not necessary to consider the machining accuracy of the portion of the holder to which the positioning member is attached and the attachment accuracy when attaching the positioning member to the holder.

Figure 5:
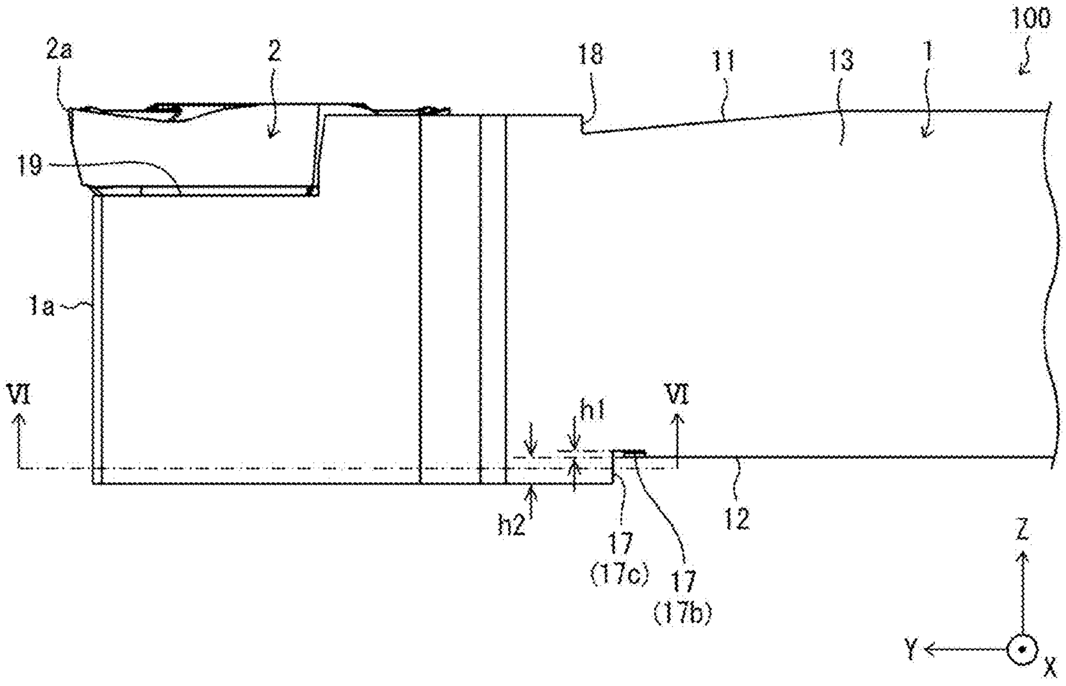
FIG. 5 is a partial enlarged view of the cutting tool illustrated in FIG. 3.
Figure 6:
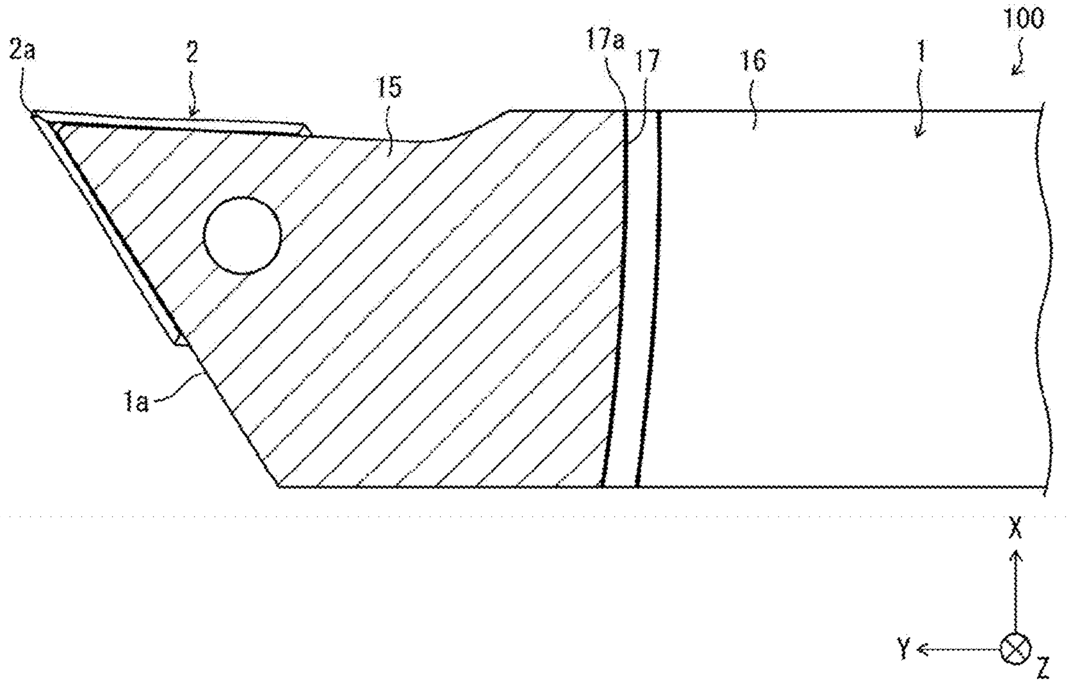
FIG. 6 is a cross-sectional view taken along a line VI-VI in FIG. 5.

As illustrated in FIG. 6, which is a view taken along a line VI-VI of FIG. 5, the step 17 has a convex curve shape toward the second end 1*b* in a cross section parallel to the first region 15. As illustrated in FIGS. 5 and 6, the step 17 has a convex curve shape toward the second end 1*b* in the above-described cross section and has a curved surface shape having a constant width in the Y-axis direction. If the step 17 has a linear shape in the cross section described above, that is, if the step 17 is provided to extend straight in the X-axis direction in FIG. 6, the step 17 may be extremely inclined toward the side of the first end 1*a* or the side of the second end 1*b* due to an error during processing of the step 17.

Figure 11:
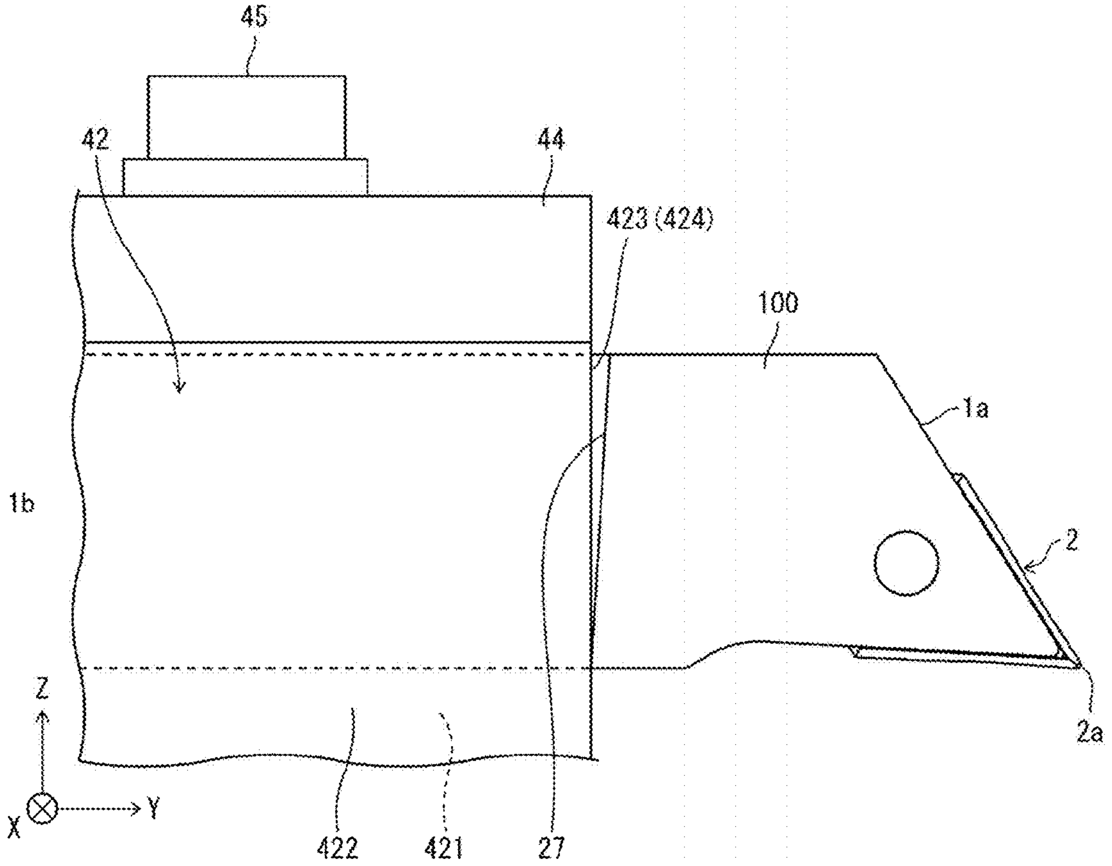
FIG. 11 is an enlarged view of a reference example of the cutting tool illustrated in FIG. 10.

In this case, the step 17 comes into point contact with a locking portion of the tool post 4 (refer to FIG. 11). FIG. 11 is an enlarged side view illustrating a state in which a right corner portion of the locking portion of the tool post 4 is in contact with the step 17 in case that the step 17 is formed to be inclined toward the side of the first end 1*a* due to a processing error in the case where the step 17 is provided to extend straight in the Z-axis direction. Even if the holder 1 and the tool post 4 are elastically deformed, a contact region between the holder 1 and the locking portion of the tool post 4 is limited under the situation where the step 17 is extremely inclined as described above, and therefore, the situation is substantially the same as the situation of the point contact. In such a point contact, if a cutting load is applied by the cutting machining, the cutting load cannot be received by the tool post 4, and therefore, the holder 1 may move. As a result, positioning of the holder 1 cannot be performed, and the machining accuracy of cutting deteriorates.

Figure 10:
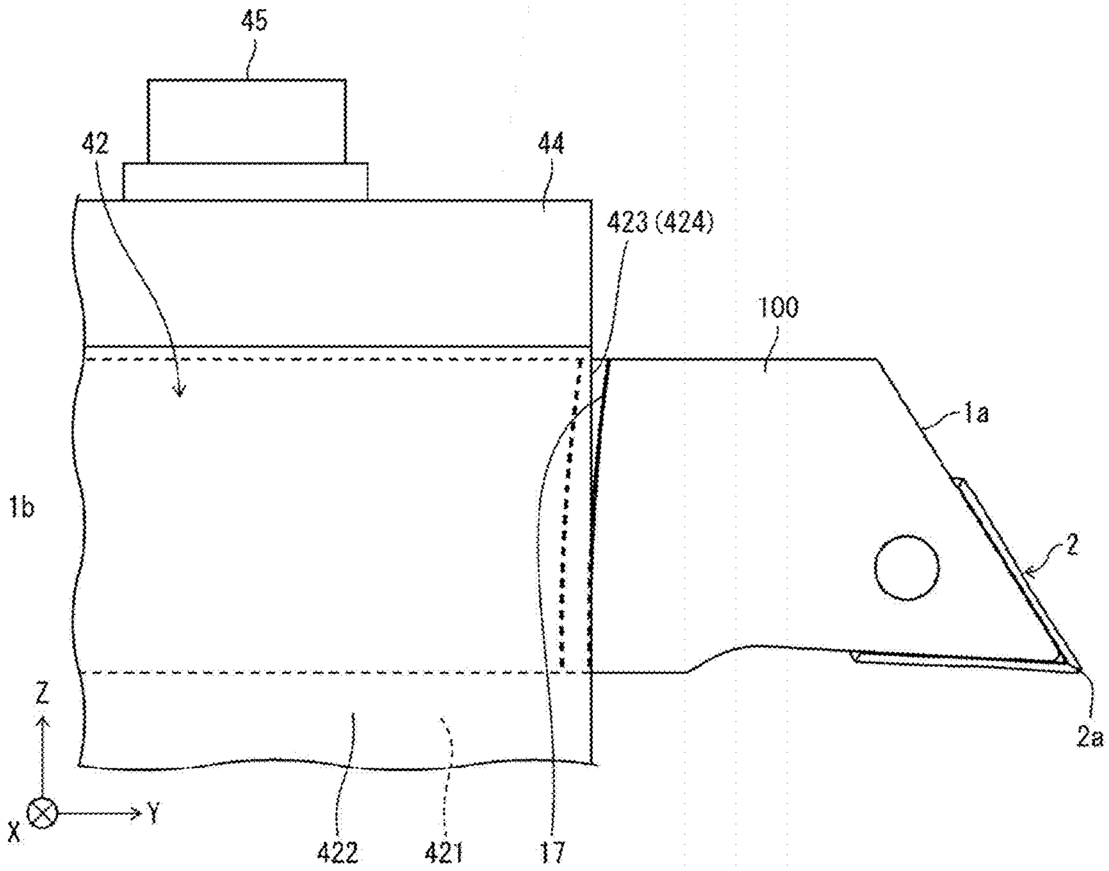
FIG. 10 is a partial enlarged view of a front-side part in FIG. 9.

On the other hand, since the step 17 is formed to have a convex curve shape toward the second end 1*b*, the step 17 comes into point contact with the locking portion of the tool post 4 on a curve, and actually comes into surface contact with the locking portion due to elastic deformation; consequently, stable positioning can be easily performed (refer to FIG. 10). Even if a machining error occurs in the step 17, the error is absorbed because the step has a curve shape. When a cutting load is applied, the load is absorbed, the positioning accuracy, in other words, the attachment accuracy to the tool post 4 can be maintained, and the machining accuracy of cutting is favorable.

The step 17 may have an arc shape in the cross section described above. In this case, the influence of a machining error of the step 17 can be further reduced.

In a front view of the second side surface 12, at least a part of the step 17 may be located in a region obtained by extending the pocket 19 toward the second end 1*b*. In this case, at least a part of the step 17 is positioned on a rear side of the pocket 19, so that the cutting load can be absorbed at the time of cutting machining and favorable positioning accuracy can be maintained.

The step 17 may be in contact with the third side surface 13 and the fourth side surface 14. In this case, the step 17 is provided over the entire width of the second side surface 12, so that durability against the cutting load is high and favorable positioning accuracy can be maintained.

As illustrated in FIGS. 4 and 6, the step 17 may have a front end portion 17*a* located closest to the second end 1*b*, and the length from the front end portion 17*a* to the third side surface 13 may be shorter than the length from the front end portion 17*a* to the fourth side surface 14. In this case, the thickness of the front end portion 11*a* having the pocket 19 can be ensured, and thus, the durability against the cutting load is increased.

The front end portion 17*a* may be in contact with the third side surface 13. In this case, the step 17 is provided over a wide range of the second side surface 12, and thus, the durability against the cutting load is high.

As illustrated in FIG. 3, the second side surface 12 on which the step 17 is formed may be apart from the pocket 19. By forming the step 17 on the second side surface 12 apart from the pocket 19, the cutting load can be received more favorably than by forming the step 17 on the first side surface 11 or the third side surface 13 on which the pocket 19 is formed, and thus, the positioning accuracy is favorable.

In the cutting tool 100 described above, the step 17 is provided on the second side surface 12, but the present invention is not limited thereto. As described below, the step 17 may be provided on the first side surface 11 or the third side surface 13 that can be locked to the tool post 4.

Attachment Structure to Tool Post

Figure 7:
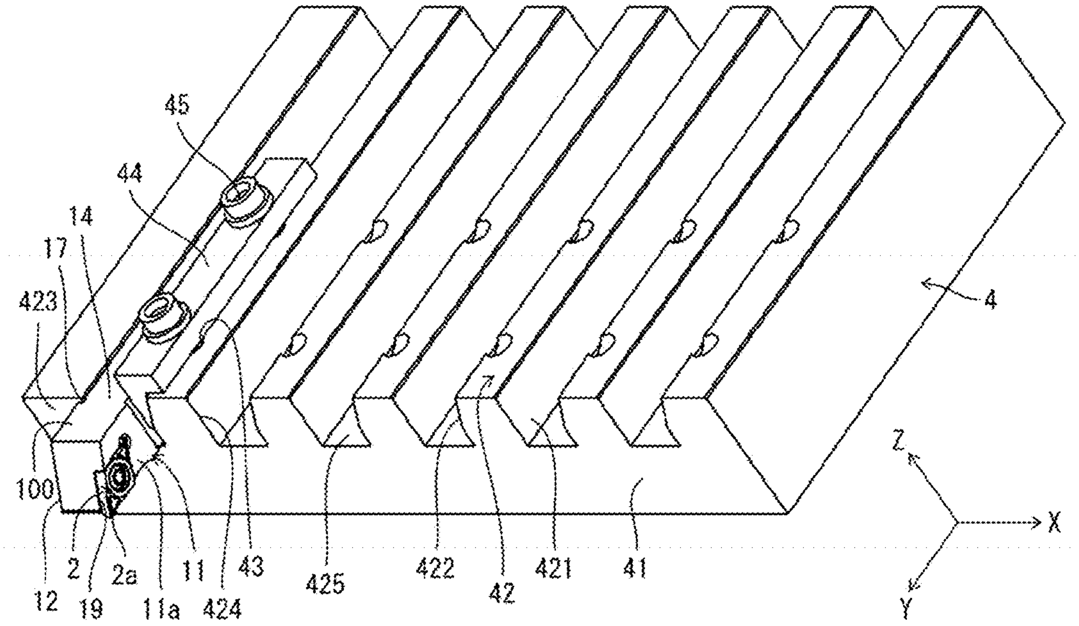
FIG. 7 is a perspective view illustrating a state in which the cutting tool of the non-limiting embodiment of the present disclosure is supported by a tool post.
Figure 8:
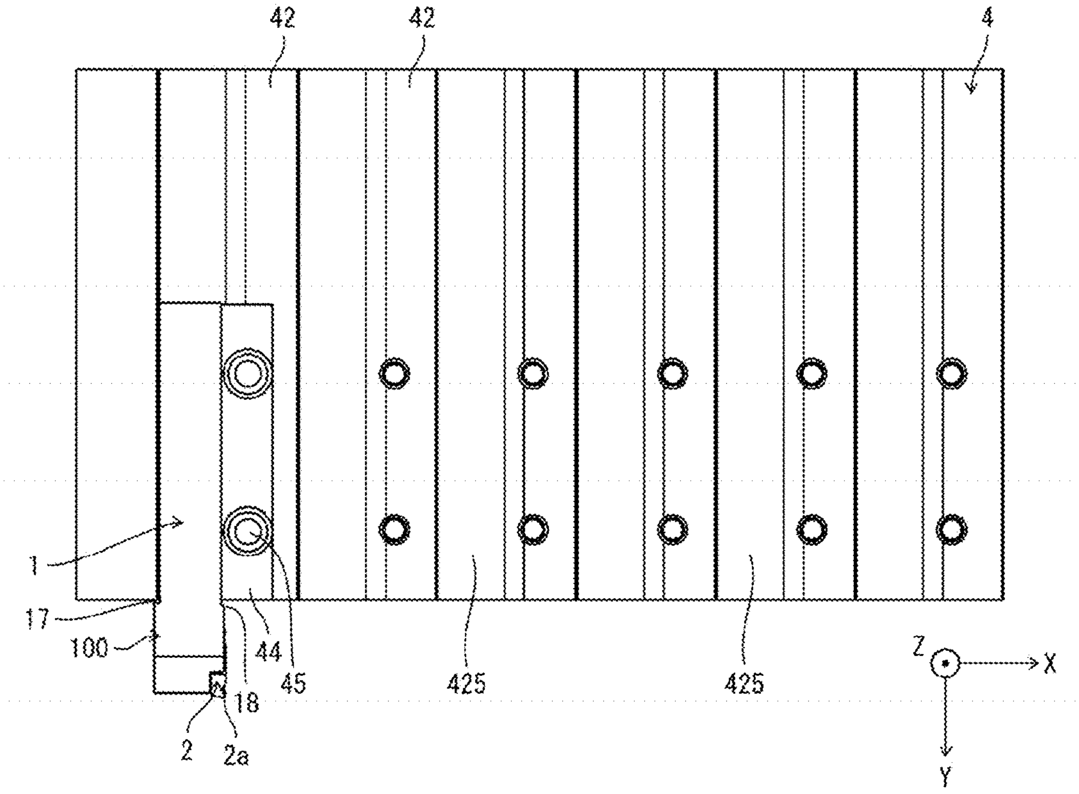
FIG. 8 is a plan view of the cutting tool and tool post illustrated in FIG. 7.
Figure 9:
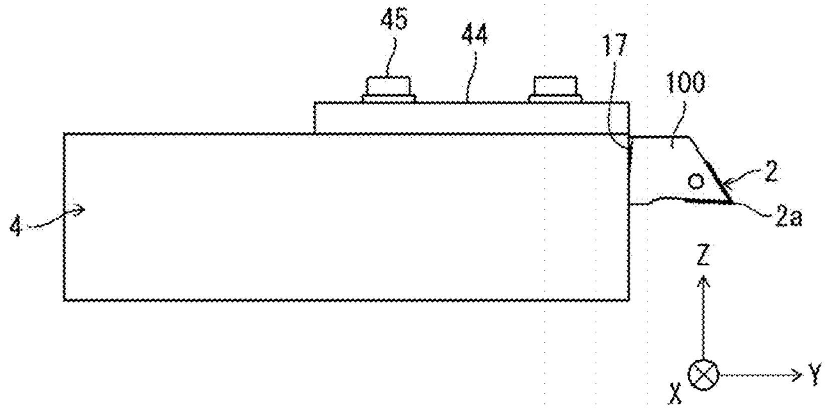
FIG. 9 is a side view of the cutting tool and tool post illustrated in FIG. 7.

FIG. 7 is a perspective view illustrating a state in which the cutting tool 100 of the non-limiting embodiment of the present disclosure is supported by the tool post 4. FIG. 8 is a plan view of the cutting tool 100 and tool post 4 illustrated in FIG. 7. FIG. 9 is a side view of the cutting tool 100 and tool post 4 illustrated in FIG. 7 of FIG. 8. FIG. 10 is a partial enlarged side view of a front-side part in FIG. 9.

In each of the drawings, the X-axis direction is defined as a left-right direction, the Z-axis direction is defined as an up-down direction, and the Y-axis direction is defined as a front-rear direction. In FIG. 7, a side on which the insert 2 is located is defined as a right side in the X-axis direction and a front side in the Y-axis direction, and a side on which the fourth side surface 14 is located is defined as an upper side in the Z-axis direction.

As illustrated in FIG. 7, the tool post 4 includes a base 41, a plurality of support portions 42, a screw hole 43, a clamping portion 44, and a set screw 45. The base 41 has, for example, a rectangular plate shape in which a dimension in the X-axis direction is greater than a dimension in the Y-axis direction. On the base 41, the plurality of support portions 42 extending in the Y-axis direction are provided in a comb-like shape. A tool post in which a plurality of support portions 42 are provided in a comb-like shape as illustrated in FIG. 7 is generally referred to as a comb-like tool post.

The support portion 42 has a right side surface 421, a left side surface 422, a front end surface 423, and a bottom surface 425. The bottom surface 425 is a bottom of the comb-like groove and faces upward. The right side surface 421 stands upward from the bottom surface 425. The left side surface 422 has a shape that stands upward from the bottom surface 425 and then is inclined obliquely upward to the right. The front end surface 423 is located on a front side between the right side surface 421 and the left side surface 422.

Two screw holes 43 are provided near the front side of the support portion 42. The clamping portion 44 has an L-shape in a front view. The clamping portion 44 is inserted between the cutting tool 100 and the left side surface 422 in a state in which a vertical side portion of the L-shape is in contact with the oblique portion of the left side surface 422, and is screwed into the screw hole 43 of the support portion 42 by inserting the set screw 45 into a horizontal side portion of the L-shape.

The cutting tool 100 is placed between the adjacent support portions 42 in a state in which the first side surface 11 faces rightward and the right corner portion 424 of the front end surface 423 of the support portion 42 is locked to the step 17 so that the front end portion 11*a* is located forward. As described above, since the step 17 has a convex curve shape toward the second end 1*b* in the cross-sectional view, the step 17 can be brought into surface contact with the right corner portion 424, as illustrated in FIG. 10, and can be favorably positioned. In this state, the clamping portion 44 is inserted between the first side surface 11 and the adjacent support portion 42, and the set screw 45 is screwed into the screw hole 43, whereby the cutting tool 100 is fixed to the tool post 4. Since the step 17 is formed in a curve shape, even if a machining error of the step 17 occurs, the right corner portion 424 can come into surface contact with the step 17. When a load is applied to the step 17 during cutting machining, the load is absorbed, and the positioning accuracy is maintained.

FIG. 11 is an enlarged side view illustrating a state in which the right corner portion 424 is in contact with the step 27 when the step 27 is formed to be inclined toward the first end 1*a* side due to a machining error in the case where the step is provided to extend straight in the Z-axis direction. As illustrated in FIG. 11, the right corner portion 424 comes into point contact with the step 27, so that it is likely to move and positioning thereof is difficult.

A plurality of cutting tools 100 are supported between the support portions 42 and 42. According to the cutting tool 100 of the present disclosure, positioning of the cutting tool 100 in the Y-axis direction can be favorably performed, and the amount of protrusion of the front end portion 11*a* from the base 41 can be favorably made uniform among the cutting tools 100. Therefore, the same workpiece can be machined sequentially with high accuracy by the plurality of cutting tools 100. Even if a cutting load is applied at the time of cutting machining, it can be absorbed by the step 17, and positioning accuracy can be maintained.

As in the example illustrated in FIGS. 4 and 5, the step 17 may have a groove shape recessed toward the first side surface 11. In this case, the step 17 may have a bottom surface 17*b* closest to the first side surface 11. It can also be said that the bottom surface 17*b* is located closest to the first side surface 11 in the step 17. In this case, as in the example illustrated in FIG. 5, the bottom surface 17*b* may be located closer to the first side surface 11 than the second region 16.

A wall surface standing from the bottom surface 17*b* of the step 17 and facing a side of the bottom surface 17*b* is defined as a wall surface 17*c* illustrated in FIG. 5. In this case, in the step 17, a boundary between the bottom surface 17*b* and the wall surface 17*c* is likely to have relatively low strength. When attaching the cutting tool 100 to the tool post 4, if the right corner portion 424 comes into contact with the boundary, a crack may occur in the boundary. However, in case that the step 17 has the above-described configuration, the right corner portion 424 is unlikely to come into contact with the boundary. Therefore, a decrease in the strength of the holder 1 can be avoided.

In case that the step 17 has the bottom surface 17*b*, a height h1 from the bottom surface 17*b* to the second region 16 may be smaller than a height h2 from the second region 16 to the first region 15. Here, "height" means the width in the up-down direction of the Z axis. In case that the height h1 is relatively small, a situation where the thickness of the holder 1 between the bottom surface 17*b* and the first side surface 11 becomes excessively small can be avoided. In case that the height h2 is relatively large, the positioning accuracy of the holder 1 with respect to the tool post 4 by the step 17 is highly ensured.

Method for Manufacturing Machined Product

A method for manufacturing a machined product according to one non-limiting aspect of the present disclosure will be described with reference to the drawings.

A machined product 101 is manufactured by carrying out cutting machining of a workpiece 103. The method for manufacturing the machined product 101 in the embodiment includes the following steps:

(1) rotating the workpiece 103, (2) bringing the cutting tool 100 represented by the embodiment described above into contact with the workpiece 103 being rotated, and (3) separating the cutting tool 100 from the workpiece 103.

Figure 12:
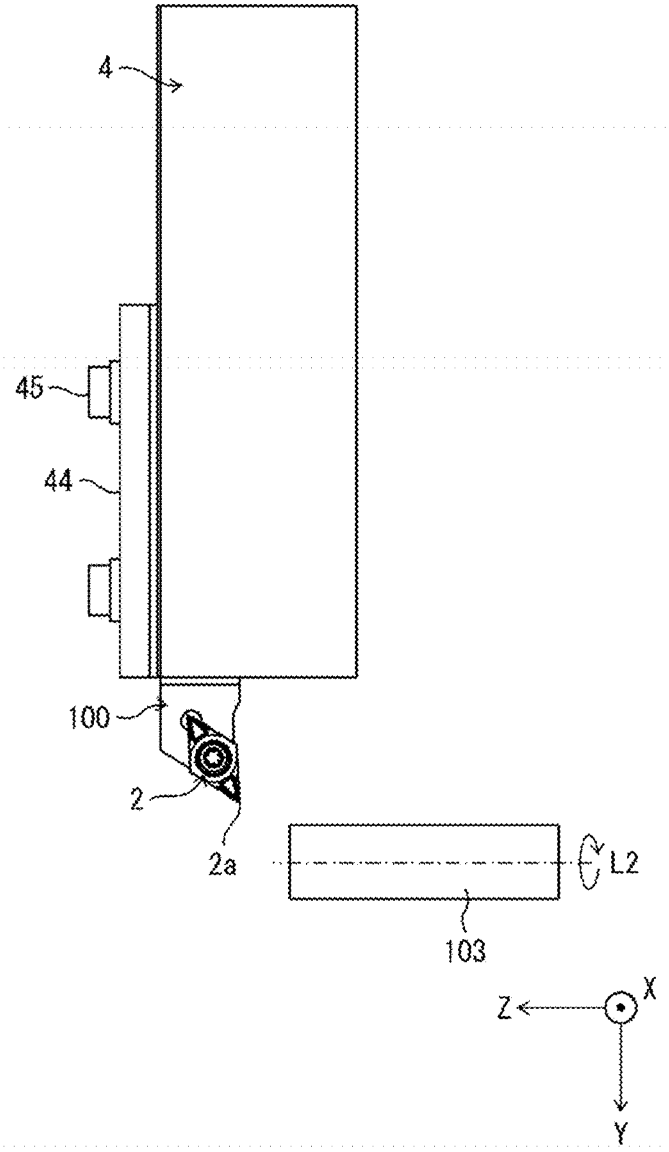
FIG. 12 is a schematic diagram illustrating a process of the method for manufacturing a machined product of the non-limiting example.
Figure 13:
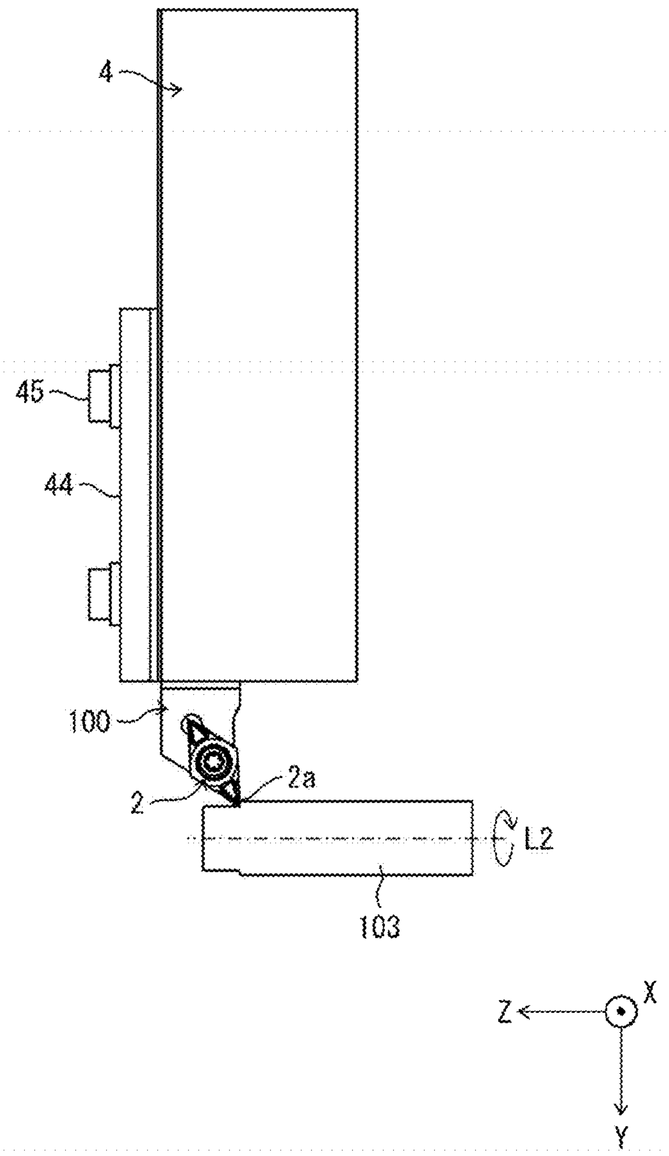
FIG. 13 is a schematic diagram illustrating a process of the method for manufacturing a machined product of the non-limiting example.

More specifically, first, as illustrated in FIG. 12, while the workpiece 103 is made to rotate about a second central axis L2, the tool post 4 supporting the cutting tool 100 is brought relatively close to the workpiece 103. Then, as illustrated in FIG. 13, at least a part of the cutting edge 2*a* of the cutting tool 100 is brought into contact with the workpiece 103 to cut the workpiece 103. Then, as illustrated in FIG. 14, the cutting tool 100 is relatively moved away from the workpiece 103 or the machined product 101.

As illustrated in FIG. 12, the cutting tool 100 is brought close to the workpiece 103 by moving the cutting tool 100 in the forward direction of the Y-axis in a state in which the second central axis L2 is fixed and the workpiece 103 is rotated.

As illustrated in FIG. 13, the workpiece 103 is cut by moving the cutting tool 100 in the downward direction of the Z-axis and the forward direction of the Y-axis in a state in which at least a part of a portion of the insert 2 used as the cutting edge 2*a* is brought into contact with the workpiece 103 being rotated.

Figure 14:
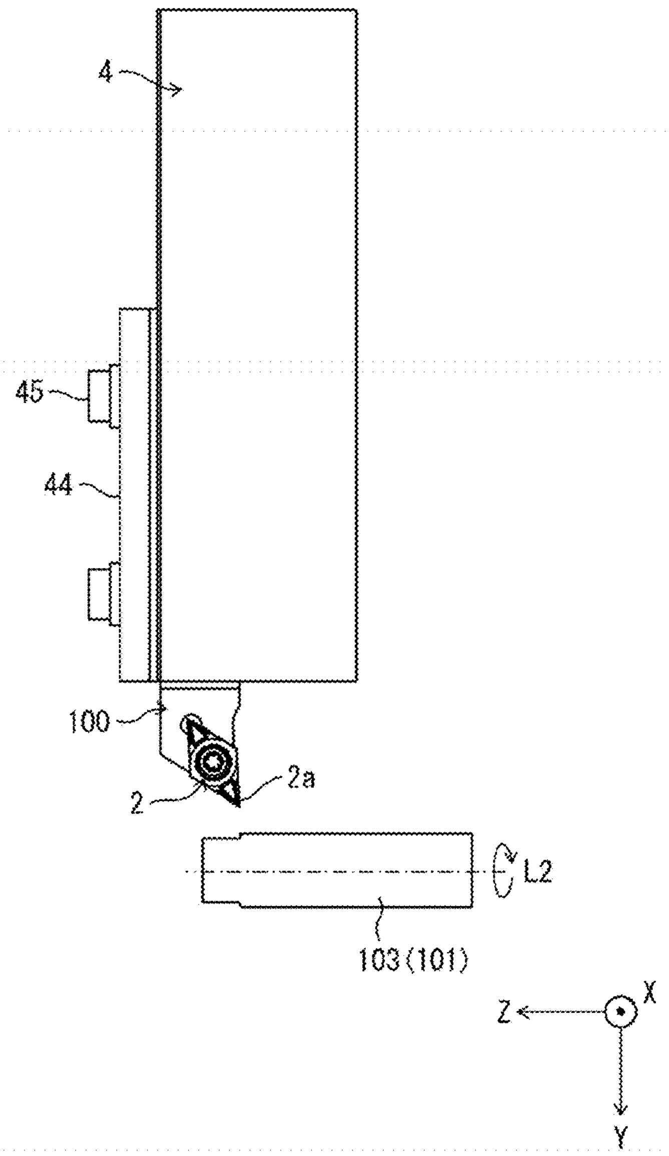
FIG. 14 is a schematic diagram illustrating a process of the method for manufacturing a machined product of the non-limiting example.

Then, as illustrated in FIG. 14, the cutting tool 100 is moved away from the workpiece 103 by moving the cutting tool 100 in the rearward direction of the Y-axis in a state in which the workpiece 103 is rotated.

By moving the cutting tool 100 in each step, the cutting tool 100 is brought into contact with the workpiece 103 or the cutting tool 100 is separated from the workpiece 103. However, the present invention is not limited to such a case.

For example, in step (1), the workpiece 103 may be brought close to the cutting tool 100. In step (3), the workpiece 103 may be moved away from the cutting tool 100. When continuing the cutting machining, a step of bringing at least a part of the cutting edge 2*a* of the insert 2 into contact with different locations of the workpiece 103 while the workpiece 103 is kept rotating may be repeated. The cutting machining may be continuously performed for the workpiece 103 by another cutting tool 100 supported by the tool post 4.

Representative examples of the material of the workpiece 103 may include hardened steel, carbon steel, alloy steel, stainless steel, cast iron, non-ferrous metals, or the like.

According to the method for manufacturing a machined product of the present disclosure, since the cutting tool 100 of the present disclosure is favorably positioned on the tool post 4 and the holder 1 by the step 17, machining can be performed with high accuracy. When performing the cutting machining while supporting a plurality of cutting tools 100 by the tool post 4, the amount of protrusion from the base 41 can be made uniform, and thus machining can be performed sequentially with high accuracy.

REFERENCE SIGNS

1 Holder
1*a* First end (Front end)
1*b* Second end (Rear end)
11 First side surface
12 Second side surface
13 Third side surface
14 Fourth side surface
15 First region
16 Second region
17 Step
17*b* Bottom surface
17*c* Wall surface
18 Protruding step
19 Pocket
20 Front end surface
21 Rear end surface
2 Cutting insert (insert)
2*a* Cutting edge
3 Screw
4 Tool post
41 Base
42 Support portion
43 Screw hole

44 Clamping portion
45 Set screw
100 Cutting tool
101 Machined product
103 Workpiece
L1 First central axis
L2 Second central axis

The invention claimed is:

1. A holder having a square column shape extending from a first end toward a second end and comprising:
- a pocket located on a side of the first end and to which a cutting insert is configured to be attached;
- a first side surface extending from the first end toward the second end;
- a second side surface located opposite the first side surface;
- a third side surface located between the first side surface and the second side surface; and
- a fourth side surface located between the first side surface and the second side surface and located opposite the third side surface, wherein
- the second side surface comprises
  - a first region that is flat and that is located on the side of the first end,
  - a second region that is flat and that is located closer to the second end than the first region and closer to the first side surface than the first region, and
  - a step connecting the first region and the second region,
- the step has a convex curve shape toward the second end in a cross section parallel to the first region,
- the pocket is open to the first side surface and the third side surface, and
- the step is in contact with the third side surface and the fourth side surface.

2. The holder according to claim 1, wherein
in a front view of the second side surface, at least a part of the step is located in a region obtained by extending the pocket toward the second end.

3. The holder according to claim 1, wherein
the step has an arc shape in the cross section.

4. The holder according to claim 1, wherein
the second side surface is apart from the pocket.

5. The holder according to claim 1, wherein
in the cross section,
- the step has a front end portion located closest to the second end, and
- a length from the front end portion to the third side surface is shorter than a length from the front end portion to the fourth side surface.

6. The holder according to claim 5, wherein
the front end portion is in contact with the third side surface.

7. The holder according to claim 1, wherein
- the step has a groove shape recessed toward the first side surface and has a bottom surface closest to the first side surface, and
- the bottom surface is located closer to the first side surface than to the second region.

8. The holder according to claim 7, wherein
a height from the bottom surface to the second region is smaller than a height from the second region to the first region.

9. A cutting tool, comprising:
- a holder having a square column shape extending from a first end toward a second end and comprising:
  - a pocket located on a side of the first end and to which a cutting insert is configured to be attached,
  - a first side surface extending from the first end toward the second end,
  - a second side surface located opposite the first side surface,
  - a third side surface located between the first side surface and the second side surface, and
  - a fourth side surface located between the first side surface and the second side surface and located opposite the third side surface; and
- a cutting insert located in the pocket, wherein
- the second side surface comprises
  - a first region that is flat and that is located on the side of the first end,
  - a second region that is flat and that is located closer to the second end than the first region and closer to the first side surface than the first region, and
  - a step connecting the first region and the second region,
- the step has a convex curve shape toward the second end in a cross section parallel to the first region,
- the pocket is open to the first side surface and the third side surface, and
- the step is in contact with the third side surface and the fourth side surface.

10. A method for manufacturing a machined product, the method comprising:
- rotating a workpiece;
- bringing a cutting tool into contact with the workpiece that is rotating; and
- separating the cutting tool from the workpiece, wherein
- the cutting tool comprises:
  - a holder having a square column shape extending from a first end toward a second end and comprising:
    - a pocket located on a side of the first end and to which a cutting insert is configured to be attached,
    - a first side surface extending from the first end toward the second end,
    - a second side surface located opposite the first side surface,
    - a third side surface located between the first side surface and the second side surface, and
    - a fourth side surface located between the first side surface and the second side surface and located opposite the third side surface, and
  - a cutting insert located in the pocket,
- the second side surface comprises
  - a first region that is flat and that is located on the side of the first end,
  - a second region that is flat and that is located closer to the second end than the first region and closer to the first side surface than the first region, and
  - a step connecting the first region and the second region,
- the step has a convex curve shape toward the second end in a cross section parallel to the first region,
- the pocket is open to the first side surface and the third side surface, and
- the step is in contact with the third side surface and the fourth side surface.

* * * * *